Sept. 17, 1940.                A. KRAKAUER                 2,215,373
                         CLIP FOR SINUOUS SPRINGS
                           Filed May 8, 1939
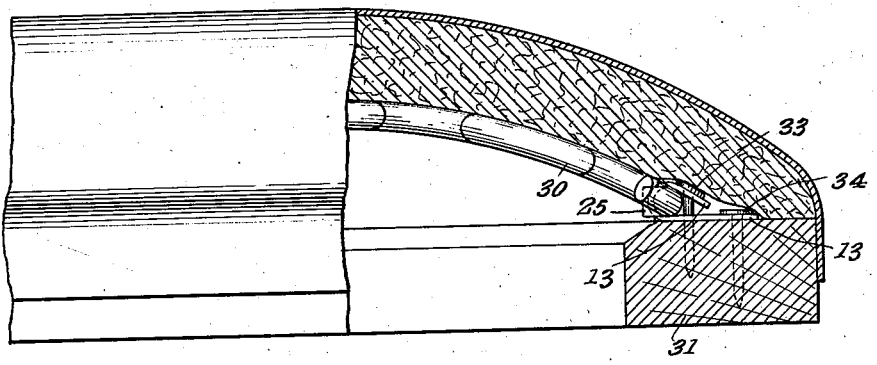
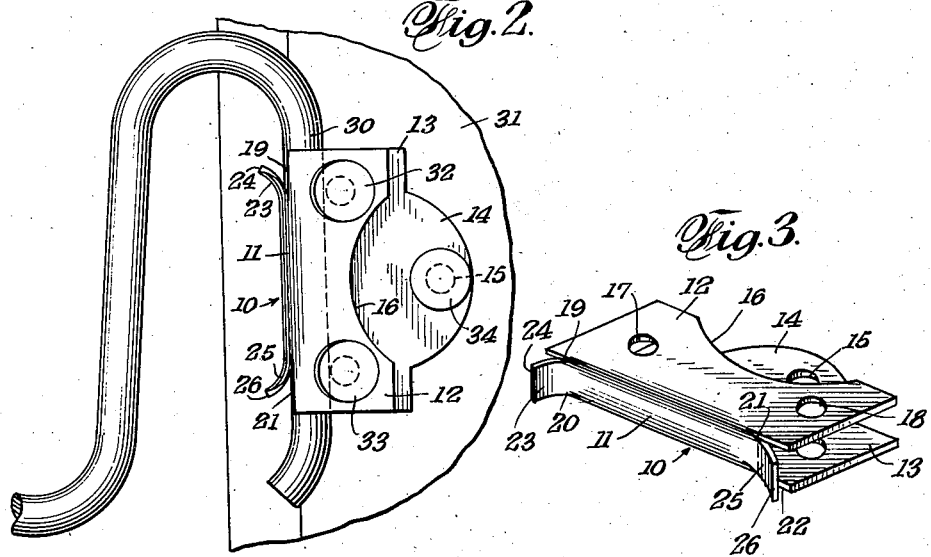
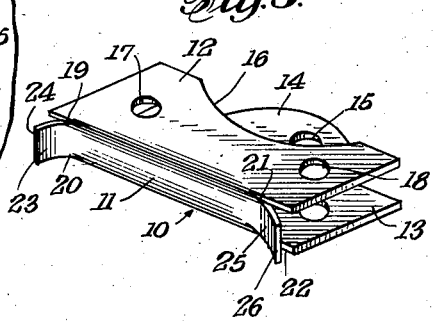
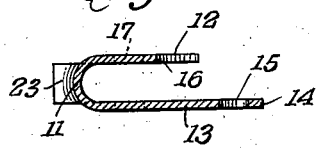
INVENTOR
*Abraham Krakauer*
BY
*Harry Jacobson*
ATTORNEY Patented Sept. 17, 1940

2,215,373

UNITED STATES PATENT OFFICE 2,215,373

CLIP FOR SINUOUS SPRINGS

Abraham Krakauer, Brooklyn, N. Y., assignor to Kay Manufacturing Corporation, Brooklyn, N. Y., a corporation of New York Application May 8, 1939, Serial No. 272,405

8 Claims. (Cl. 155—179)

This invention relates to clips and particularly to those designed for holding in place the ends of sinuous springs of the type shown in the Kaden Patent No. 2,002,399, and commonly known as "No-Sag" springs.

The end of a sinuous spring is usually held to the frame of an article of furniture by means of a clip provided with a pair of spaced initially horizontal flanges connected by a wall. The end of the sinuous spring is inserted between the flanges and against the wall. Shifting of the spring transversely of the clip when the spring is stressed frequently brings the spring into contact with the sharp edges at the ends of the wall. When the spring is in this position in contact with the sharp edge, stresses on the spring frequently causes the spring to rub against the sharp edge and thereby to produce a squeaking noise.

My invention therefore contemplates the provision of a clip in which the sharp edge of the wall is so arranged that when the sinuous spring is for any reason shifted transversely, it cannot touch said edge but contacts with the intermediate part of the clip wall and rubbing of the spring against the clip in a manner to cause a noise is entirely prevented.

My invention further contemplates the provision of a clip having curved end portions projecting from the wall, which portions are separated from the flanges of the clip by making suitable slits in the clip at said end portions, whereby the sinuous spring cannot come into contact with any sharp edge of the clip in any transverse position of the spring.

The various objects of the invention will be clear from the description which follows, and from the drawing, in which, Fig. 1 is a side elevation and vertical section of part of an article of furniture to which my improved clip has been applied, showing the clip as it appears when in use.

Fig. 2 is a fragmentary top plan view of the same, showing the clip and the end portion of a sinuous spring held thereby.

Fig. 3 is a perspective view of the clip.

Fig. 4 is a vertical section of the same.

In the practical embodiment of the invention which I have shown by way of example, the clip, designated generally by the numeral 10, is made of a single piece of sheet metal having the upper horizontal flange 12 and the lower horizontal flange 13, said flanges being integrally connected by the wall 11 which is preferably curved to fit the wire of the end 30 of the sinuous spring held by the clip.

Each of the flanges 12 and 13 is of generally rectangular outline and flat, the lower flange, however, being provided with a convex projection 14 on its free edge, the hole 15 being made in said projection. In the corresponding free edge of the upper flange 12, an arcuate cut-out or recesss as 16 is made. For securing the clip in place, the flange 12 is provided with the pair of spaced holes 17 and 18, aligned vertically with corresponding holes in the flange 13, through which holes, nails, screws or other fastening means may be driven.

To avoid any possibility of the sharp end edge of the wall 11 coming into contact with the spring in any transversely shifted position of the spring relatively to the clip, part of each end portion of the wall 11 is bent outwardly beyond the remainder of the wall and beyond the flanges. For this purpose, suitable slits are made at the juncture of the wall 11 and the flanges 12 and 13, said slits extending from the ends of the clip toward each other. The spaced slits 19 and 20 are about the same length, and extend inwardly from one end of the clip while the spaced slits 21 and 22 extend inwardly toward the slits 19 and 20 from the other end of the clip. The material between the slits 19, 20 is separated from the wall 11 and from the flanges, being bent into partly cylindrical form convex inwardly to provide the wall 23, at the free end of which is the sharp edge 24 in spaced relation to the wall 11. Similarly, the material 25 between the slits 21 and 22 is also bent away from the wall 11 into arcuate form so that the sharp edge 26 at the free end thereof is similarly in spaced relation to the wall 11. The thus separated parts 23 and 25 at the ends of the wall 11 are flattened in a vertical direction but are curved concavely outwardly about a vertical axis. The amount of curvature is such that the radius of curvature of said parts 23 and 25 is small or in other words, sufficiently small to arrange the sharp free end edges of said parts out of the way or out of the path of possible transverse movement of the end part of the spring.

As is best seen in Fig. 2, the end portion 30 of the sinuous spring held by the clip is arranged between the flanges 12 and 13 and against the inner surface of the wall 11. The clip being then set in place on the frame 31, the nails 32 and 33 are driven through the holes 17 and 18, respectively, and through the corresponding aligned holes in the flange 13 and into the frame. The holes 17 and 18 are spaced from the wall 11 a distance substantially equal to the diameter of the wire from which the spring 30 is made so that said nails 32 and 33 serve to hold the spring end against longitudinal displacement in the clip. When said nails are hammered into place, the flange 12 is also bent downwardly around the spring end and aids in holding the spring against longitudinal displacement. The nails 34 pass through the opening 15 and into the frame, also aiding to hold the clip in place.

It will be seen that should the spring 30 shift transversely to a sufficient extent to carry a curved part thereof into contact with the arcuate portion 23 or 25, rubbing of the spring against said arcuate portions does not result in any noise or squeaking since the sharp edges 24 and 26 thereof remain in substantial spaced relation to the spring at all times.

It will therefore be seen that I have provided a clip adequate to hold the spring end in place, as well as serving to so hold the spring as to prevent squeaking when the spring rubs against the clip.

While I have shown and described certain specific embodiments of my invention, I do not wish to be understood as limiting myself thereto, but intend to claim the invention as broadly as may be permitted by the state of the prior art and the scope of the appended claims.

I claim:

1. In a clip for the end of a sinuous spring, a wall having a pair of spaced slits at each end thereof, and a flange extending from each edge of the wall, the material between the slits at each end of the wall being curved away from the slits and outwardly of the clip and beyond the flanges.

2. A sheet metal clip having a pair of spaced perforated flanges joined by a wall, the end portions of the wall being curved away from said flanges and in spaced relation thereto.

3. A sheet metal clip having a pair of spaced perforated flanges joined by a curved wall, the end portions of the wall being curved away from the flanges and being of partly cylindrical shape.

4. A one-piece sheet metal clip having a pair of spaced flanges, one of said flanges having a concavely cut-out edge and the other of the flanges having a perforated convex extension on its edge, said flanges having aligned openings therein, a wall joining the flanges and an end portion at each end of the wall separated from the flanges and curved away from the flanges.

5. A one-piece sheet metal clip having a pair of spaced horizontal flanges, one of said flanges having a concavely cut-out edge and the other of the flanges having a perforated convex extension on its edge, said flanges having aligned openings therein, an upright wall joining the flanges and an end portion at each end of the wall separated from and curved away from the flanges, each of said end portions terminating in a free end and being curved about a vertical axis into partly cylindrical form having a radius sufficiently small to prevent contact of a sinuous spring held by the clip with the free end of said end portion on the transverse shifting of the spring in the clip.

6. A one-piece sheet metal clip for the end of a sinuous spring, said clip having a pair of spaced horizontal flanges, a wall joining the flanges, and end portions on the wall each terminating in a free end, each of said end portions being curved about a vertical axis away from the flanges and in spaced relation thereto into partly cylindrical form having a radius sufficiently small to prevent contact of a sinuous spring held by the clip with the free end of said end portion on the transverse shifting of the spring in the clip and thereby preventing squeaking arising from such contact.

7. The combination with a sinuous spring having a bent end portion, of a one-piece sheet metal clip having a pair of spaced perforated flanges and a wall joining the flanges, said bent end portion of the spring being arranged between said flanges and against said wall, each of the end portions of the wall terminating in a free end and being bent away from the reminder of the wall and away from the flanges to a sufficient extent to arrange the free end of the end portion in position to clear the spring in all transverse positions of the spring relatively to the clip.

8. A sheet metal clip having a pair of spaced perforated flanges of substantial length joined by a curved wall, said flanges being adapted to receive the end part of a sinuous spring therebetween and in engagement with the middle part of said wall, the end portions of the wall being of partly cylindrical shape and being curved concavely outwardly away from the flanges sufficiently to space said end portions away from said end part of the spring when said end part is arranged between the flanges.

ABRAHAM KRAKAUER.